United States Patent [19]

Sui

[11] Patent Number: 4,846,308
[45] Date of Patent: Jul. 11, 1989

[54] LIQUID FEED PUMP SYSTEM

[75] Inventor: Masaru Sui, Uji, Japan

[73] Assignee: Mitsubishi Jidosha Kogyo Kabushiki Kaisha, Tokyo, Japan

[21] Appl. No.: 146,584

[22] Filed: Jan. 21, 1988

[30] Foreign Application Priority Data

Jan. 28, 1987 [JP] Japan ............................. 62-9863[U]

[51] Int. Cl.$^4$ ...................... F01M 11/00; F04B 39/00
[52] U.S. Cl. .................................. 184/6.23; 417/435
[58] Field of Search ............... 184/6.23; 417/437, 557

[56] References Cited

U.S. PATENT DOCUMENTS

| | | | |
|---|---|---|---|
| 1,650,917 | 11/1927 | Ward | 184/6.24 |
| 1,684,910 | 9/1928 | Cooper | 184/6.23 |
| 2,503,016 | 4/1950 | Weeks et al. | 184/6.23 |
| 2,531,319 | 11/1950 | Briggs | 184/6.23 |
| 2,928,499 | 3/1960 | Wallinger | 184/6.24 |
| 3,816,030 | 6/1974 | Straoff | 417/435 |
| 4,204,813 | 5/1980 | Tornay | 417/435 |
| 4,557,677 | 12/1985 | Hasegawa | 417/557 |

Primary Examiner—William L. Freeh
Attorney, Agent, or Firm—Frishauf, Holtz, Goodman & Woodward

[57] ABSTRACT

A liquid feed pump system having a pump for feeding a liquid stored on the suction side thereof to the discharge side, resisting a flow resistance from a discharge-side flow resistance element. A first passage connects the flow resistance element and the pump, and a second passage is formed in the first passage. The second passage has a gas-flow resistance smaller than that of the flow resistance element. At the start of pump operation, gas in the pump is quickly discharged through the second passage, so that the liquid can be fed without a delay. The second passage may be an orifice, which is bored through the wall of the first passage and opens to the atmosphere at all times, or a by-pass, which makes a detour around the discharge-side flow resistance element and continually connects the upper and lower courses of the resistance element.

4 Claims, 2 Drawing Sheets

LIQUID FEED PUMP SYSTEM

BACKGROUND OF THE INVENTION

The present invention relates to a liquid feed pump system, such as an oil pump, attached to an internal combustion engine.

An oil pump system is used to feed oil to oil supply portions of a crankshaft, dynamic valve mechanism, etc., of an internal combustion engine. In this pump system, an oil pump driven by the engine serves to compressively feed the oil, stored in an oil pan, to the oil supply portions through oil galleries and the like. When the engine stops, the oil in the oil pump, lowered in viscosity by heat, flows to the outside (oil pan) through small gaps at bearing portions or between joint surfaces of the pump housing. Thus, air may sometimes flow into the pump. If the engine is started in such a situation, the oil pump is first brought to a state (hereinafter referred to as "air-pump state") such that the air in the pump must be exhausted. Before the air is exhausted, the oil sucking capability of the pump is lowered extremely. Thus, it takes much time to start the oil being actually sucked up from the oil pan after the start of the engine. Such a situation is especially noticeable in the case of a gear-type oil pump. If flow resistance elements, such as an oil filter, check valve, etc., are located on the discharge side of the oil pump, therefore, the pump cannot discharge the air therein against the flow resistance from the resistance elements. In consequence, the oil cannot be fed to the individual oil supply portions, so that the engine may possibly suffer seizure or other trouble.

OBJECT AND SUMMARY OF THE INVENTION

The object of the present invention is to provide a liquid feed pump system constructed so that gas in a liquid feed pump is quickly discharged at the start of pump operation, whereby troubles attributable to a delay in liquid feed are eliminated.

According to the present invention, there is provided a liquid feed pump system which has a pump for feeding a liquid stored on the suction side thereof to the discharge side, resisting a flow resistance from a discharge-side flow resistance element. This pump system comprises a first passage, which connects the flow resistance element and the pump, and a second passage through which gas in the pump is discharged, the second passage being formed in the first passage and having a gas-flow resistance smaller than that of the flow resistance element.

The second passage may be an orifice, which is bored through the wall of the first passage and opens to the atmosphere at all times, or a by-pass, which makes a detour around the discharge-side flow resistance element and continually connects the upper and lower courses of the resistance element.

At the start of operation of the liquid feed pump, gas filling the pump is quickly discharged through the second passage, so that the liquid can be fed without a delay. The second passage, whose gas-flow resistance is smaller than that of the flow resistance element, has a liquid-flow resistance larger than that of the resistance element. Therefore, a leakage of the liquid through the second passage can exert only a negligible influence upon the pump performance, such as liquid discharge rate, discharge pressure, etc.

The above and other objects, features, and advantages of the invention will be more apparent from the ensuing detailed description taken in connection with the accompanying drawings.

DETAILED DESCRIPTION

Figure 1:
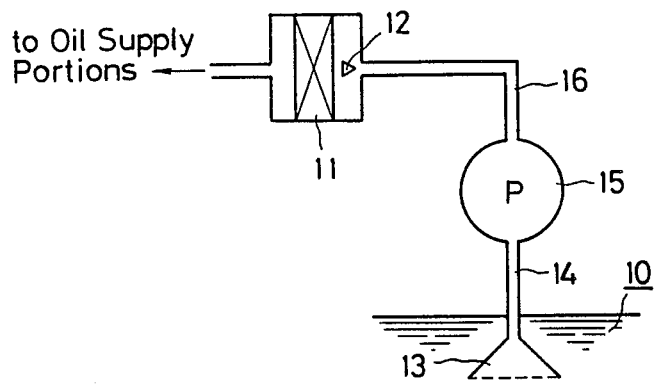
FIG. 1 is a block diagram showing the principal part of an oil pump system of a prior art internal combustion engine.

Referring first to FIG. 1, the arrangement of a prior art oil pump system used in an internal combustion engine will be described. An oil pump 15 is driven by means of an engine (not shown), and oil 10 stored in an oil pan is fed pressurized to oil supply portions of a crankshaft, dynamic valve mechanism, etc., through oil passages, such as oil galleries. The suction side of the oil pump 15 is connected, by means of an oil passage 14, to an oil strainer 13 which is immersed in the oil 10. The discharge side of the pump 15 is connected to the oil supply portions by means of an oil passage 16. An oil filter 11, a check valve 12, etc., are arranged in the middle of the oil passage 16. At the start of the engine operation, the pump 15 in the aforementioned air-pump state cannot discharge air therein, hindered by the oil filter 11, the check valve, etc., which constitute a flow resistance. Accordingly, the oil cannot be fed to the oil supply portions, so that the engine may possibly suffer seizure or other trouble.

Figure 2:
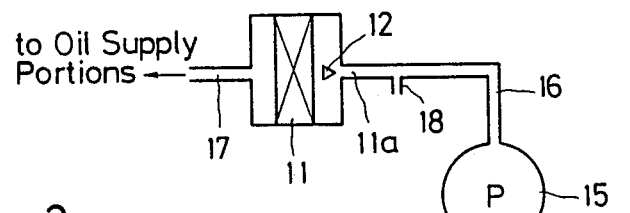
FIG. 2 is a block diagram showing the principal part of an oil pump system of an internal combustion engine according to a first embodiment of a liquid feed pump system of the present invention.

FIG. 2 shows a first embodiment of a liquid feed pump system of the present invention, which is applied to an oil pump system of an internal combustion engine. In the description to follow, like reference numerals are used to designate the same components as are included in the prior art oil pump system shown in FIG. 1.

The suction side of the oil pump 15 is connected, by means of an oil passage 14, to an oil strainer 13 which is immersed in oil 10 stored in an oil pan. The discharge side of the pump 15 is connected to an inlet port 11a of an oil filter 11 by means of an oil passage 16. The outlet side of the oil filter 11 communicates with oil supply portions of a crankshaft and the like by means of an oil passage 17. A check valve 12 is disposed at the inlet port 11a of the oil filter 11, whereby the oil is prevented from flowing back toward the oil pump 15. When the oil pressure on the upper-course side of the check valve 12 attains a predetermined pressure Pv, the valve 12 opens, thereby allowing the oil to flow from the oil-pump side toward the oil supply portions.

An orifice (passage) 18 is formed in the wall of the oil passage 16, on the discharge side of the oil pump 15, that is, halfway between the pump 15 and the oil filter 11. The orifice 18, whose diameter is smaller enough than that of the oil passage 16, is always open to the atmosphere.

Figure 4:
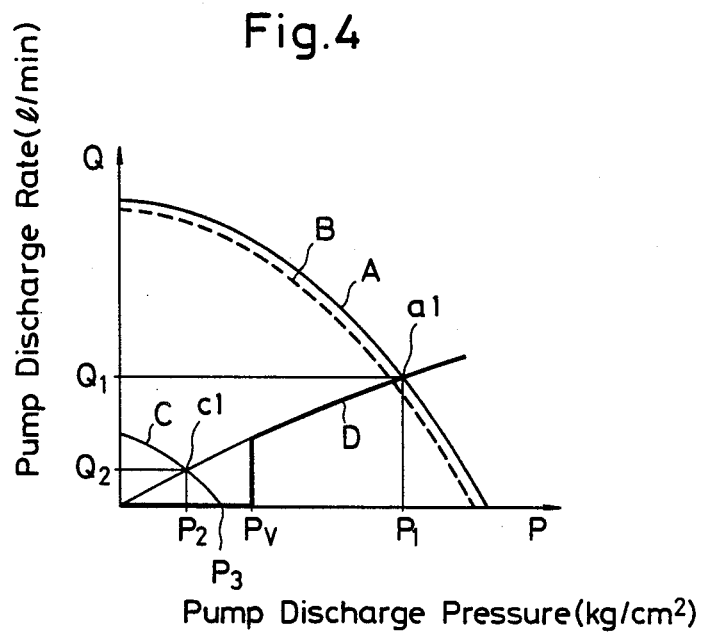
FIG. 4 shows pump characteristic curves for illustrating the operation of the oil pump system according to the invention, in association with the relationship between the pump discharge rate and discharge pressure.
Figure 5:
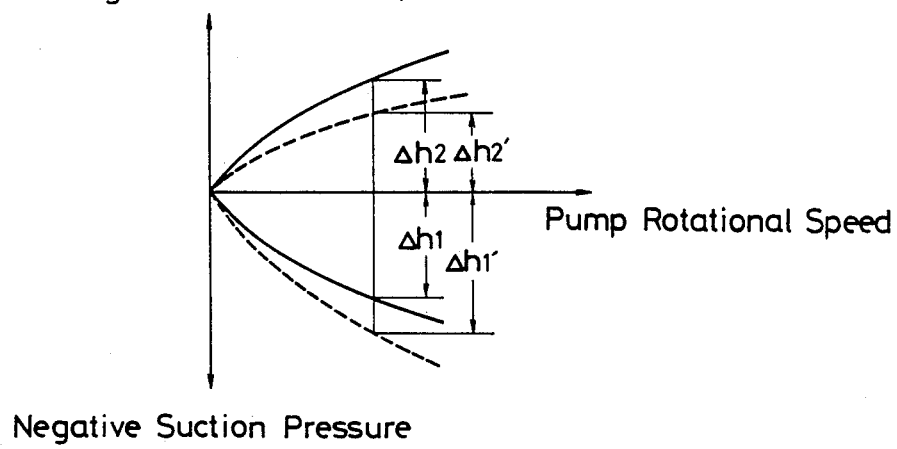
FIG. 5 is a graph for illustrating the operation of the operation of the oil pump system according to the invention, in association with the relationship between the pump discharge pressure and negative suction pressure.

Referring now to FIGS. 4 and 5, the operation of the oil pump system according to the present invention, constructed in this manner, will be described in contrast with the prior art arrangement shown in FIG. 1, in which the oil passage 16 is not provided with the orifice 18.

FIG. 4 shows characteristic curves of the oil pump 15. First, the operation of the prior art system without the orifice 18 will be described. In FIG. 4, full-line curve A represents the relationship between the oil discharge rate Q and discharge pressure P of the oil pump 15 without the orifice 18 in a normal operating state. Curve D represents the passage resistance of the whole oil passages which extend from the discharge side of the oil pump 15 to the oil supply portions. As seen from FIG. 4, the passage resistance increases along curve D and decreases along curve A as the oil discharge rate Q of the oil pump 15 increases. The discharge is equilibrated at an intersecting point a1 of curves A and D. In the end, the oil is discharged from the oil pump 15 at a discharge pressure P1 and a discharge rate Q1.

If the pump is filled with air, as a compressive fluid, at the start of pump operation, the oil pump 15 is brought to the air-pump state. The pumping performance of the oil pump 15 as an air pump is indicated by curve C in FIG. 4. If the check valve 12 is open, the pump discharge is equilibrated at an intersecting point c1 of curves C and D, and air is discharged at a rate Q2 from the oil pump 15. Thus, if the volume of the air in the oil pump 15 is Qa, the discharge of this air requires a time substantially equal to Qa/Q2 (min). Nevertheless, the air can be removed, and the oil is discharged after the passage of the time Qa/Q2.

Actually, however, the check valve 12 is disposed in a manner such that it can open only when the upper-course pressure attains the predetermined pressure Pv or more. Therefore, if the pressure Pv is higher than a discharge pressure P3 at which the discharge rate Q is zero, as indicated by curve C (Pv>P3), the discharge pressure of the pump 15 cannot increase above the value P3 although the pump rotates. Thus, the check valve 12 cannot be opened. If the valve 12 is not open, the air in the pump 15 cannot be removed at all even though the pump is actuated. In consequence, the oil can never be discharged from the oil pump 15.

If the predetermined pressure Pv is lower than the value P3 and higher than the value P2, the check valve 12 is opened. However, the air is removed at a discharge rate lower than the rate Q2 which corresponds to the value P2 on curve C. Therefore, the removal of all the air in the pump 15 takes a longer time than in the case that the check valve 12 is supposed to be open.

The check valve 12 is closed, on the other hand, in the case of the liquid feed pump according to the present invention, in which the oil passage 16 is provided with the orifice 18. However small the orifice 18 may be, the air will be able to be removed through the orifice 18. Thus, the oil can be securely discharged from the oil pump 15.

Referring now to FIG. 5, the reason why the oil sucking capability of the pump is improved by the use of the orifice 18 will be described. Without the orifice 18, the pump discharge pressure and negative suction pressure vary along the full lines shown in FIG. 5. Here let it be supposed that the negative suction pressure and the discharge pressure are $\Delta h1$ and $\Delta h2$, respectively, when the oil pump 15 rotates at a certain speed. If the pump 15 with the orifice 18 is rotated at the same speed, the necessary discharge pressure for the removal of air is lower by a margin for the presence of the orifice 18. In this case, the margin and the negative suction pressure are designated as $\Delta h2'$ and $\Delta h1'$, respectively. If the capacity of the oil pump 15 is fixed, there is a relation $\Delta h1 + \Delta h2 = \Delta h1' + \Delta h2'$. Since $\Delta h2 > \Delta h2'$ is given, we obtain $\Delta h1' > \Delta h1$, that is, the negative suction pressure is higher. The orifice 18 according to the present invention serves to minimize the air-flow resistance on the discharge side of the oil pump 15.

The diameter of the orifice 18 may be set so that the discharge pressure of the pump 15 is P2 when air flows through the orifice 18. With this arrangement, the air in the pump 15 can be removed at the same speed as is obtained when the check valve 12 is opened. If the diameter of the orifice 18 is set to the minimum possible value (e.g., to 1 mm or less), from the economical point of view, the performance of the oil pump 15 varies little, as indicated by broken-line curve B in FIG. 4. Thus, oil leakage through the orifice 18 can be minimized, so that the influence of the amount of oil supply on the oil supply portions is negligible. Since the oil flowing out through the orifice 18 returns to the oil pan, an oil passage need not be used to connect the orifice 18 to the drain side if the pump 15 is adapted for use with an internal combustion engine.

Figure 3:
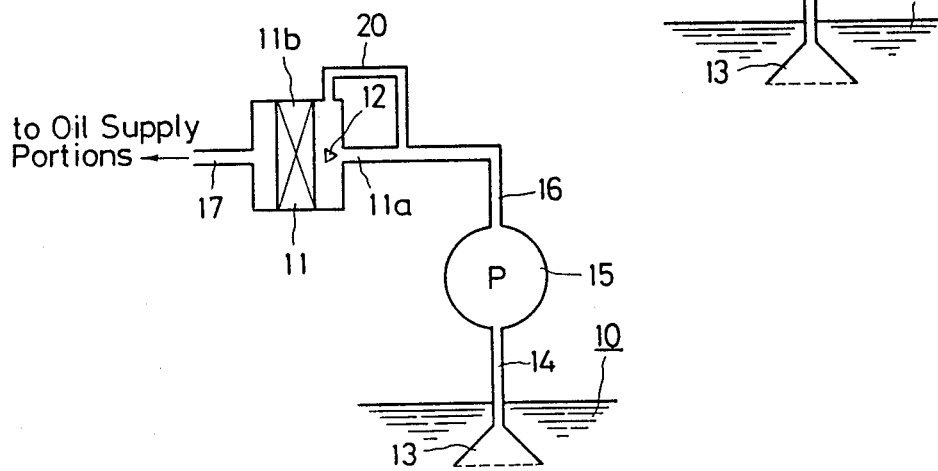
FIG. 3 is a block diagram showing the principal part of an oil pump system of an internal combustion engine according to a second embodiment of the liquid feed pump system of the invention.

FIG. 3 shows a second embodiment of the present invention. Instead of using the orifice 18 of the first embodiment, according to this second embodiment, a by-pass 20, which makes a detour around a check valve 12, is used to continually connect the upper-course side (oil passage 16) of the valve 12 and the lower-course side (upper-course side of a filter element 11b of an oil filter 11). Except for this, the two embodiments are arranged in the same manner. In FIGS. 2 and 3, therefore, like reference numerals refer to the same components throughout the views for simplicity of illustration.

Since the by-pass 20 makes a detour around the check valve 12, the discharge side of an oil pump 15 can be connected to the lower-course side of the valve 12, where the flow resistance is small. At the start of pump operation, therefore, the air filling the pump 15 can be quickly removed through the by-pass 20. The specific function of the by-pass 20, like that of the orifice 18 of the first embodiment, may be easily inferred from FIGS. 4 and 5.

In the second embodiment described above, one end of the by-pass 20 is connected to the lower- and upper-course side of the check valve 12 and the filter element 11b, respectively. Alternatively, however, the end of the by-pass may be connected to the lower-course side of the element 11b.

According to the first and second embodiments described herein, the liquid feed pump system of the present invention is applied to an oil pump system of an internal combustion engine. It is to be understood, however, that the invention is not limited to those embodiments, and may be also applied to various liquid feed pump systems for industrial use and the like.

What is claimed is:

1. A liquid feed pump system including a pump having a suction side and a discharge side, and for feeding a liquid stored on the suction side thereof to the discharge side thereof, and for resisting a flow resistance from discharge-flow resistance element, the pump system comprising:

a first passage connecting said flow resistance element to said discharge side of said pump; and a second passage through which gas in said pump is discharged, said second passage being formed in said first passage, said second passage opening to the atmosphere at all times, and said second passage having a gas-flow resistance which is smaller than that of said flow resistance element.

2. A liquid feed pump system according to claim 1, wherein said second passage comprises an orifice bored through; wall of said first passage.

3. A liquid feed pump system according to claim 1, wherein said flow resistance element includes a check valve adapted to allow a fluid only to flow from an upper course of said flow resistance element to a lower course thereof, so that the flow rate of the liquid flowing through said flow resistance element is higher than that of the liquid flowing through said second passage when said check valve is opened is allow the liquid to flow through said flow resistance element.

4. A liquid feed pump system according to claim 1, wherein said liquid is oil, said pump system further comprising means for supplying said oil to oil supply elements of an internal combustion engine.

* * * * *